(12) United States Patent
Otterstrom

(10) Patent No.: US 7,654,354 B1
(45) Date of Patent: Feb. 2, 2010

(54) SYSTEM AND METHOD FOR PROVIDING A LAUNCH ASSIST SYSTEM

(75) Inventor: Gary G. Otterstrom, Lindon, UT (US)

(73) Assignee: Gemini Energy Technologies, Inc., Lindon, UT (US)

( * ) Notice: Subject to any disclaimer, the term of this patent is extended or adjusted under 35 U.S.C. 154(b) by 453 days.

(21) Appl. No.: 11/530,151

(22) Filed: Sep. 8, 2006

Related U.S. Application Data

(60) Provisional application No. 60/715,790, filed on Sep. 10, 2005.

(51) Int. Cl.
*B60K 6/00* (2007.10)
*B60K 25/10* (2006.10)
*B60L 11/16* (2006.01)
*B62M 1/10* (2006.01)
*B60K 17/00* (2006.01)

(52) U.S. Cl. .................. 180/165; 180/305; 180/307

(58) Field of Classification Search ............... 180/165, 180/305, 307
See application file for complete search history.

(56) References Cited

U.S. PATENT DOCUMENTS

| | | | | |
|---|---|---|---|---|
| 3,177,964 A | * | 4/1965 | Anderson | 180/307 |
| 3,665,788 A | * | 5/1972 | Nyman | 475/72 |
| 3,724,583 A | * | 4/1973 | Caldwell | 180/307 |
| 4,399,886 A | * | 8/1983 | Pollman | 180/197 |
| 4,823,055 A | | 4/1989 | Bowman | |
| 5,775,453 A | * | 7/1998 | Williams et al. | 180/197 |
| 6,454,033 B1 | * | 9/2002 | Nathan et al. | 180/65.1 |
| 6,588,207 B1 | | 7/2003 | Pouliot | |
| 6,685,437 B2 | | 2/2004 | Koenig et al. | |
| 6,719,080 B1 | | 4/2004 | Gray, Jr. | |
| 6,758,295 B2 | | 7/2004 | Fleming | |
| 6,834,737 B2 | | 12/2004 | Bloxham | |
| 6,837,141 B1 | | 1/2005 | Edelson | |
| 2005/0211493 A1 | * | 9/2005 | Ochs | 180/305 |
| 2006/0000659 A1 | * | 1/2006 | Teslak et al. | 180/307 |

\* cited by examiner

*Primary Examiner*—Paul N Dickson
*Assistant Examiner*—John R Olszewski

(57) ABSTRACT

A system, method and computer readable media are disclosed for providing a hydraulic system for a vehicle. The system includes at least one accumulator for storing hydraulic fluid and may also include a flywheel or other storage mechanism for storing energy. Energy may be stored either in one of the accumulators or the flywheel. A control system controls fluid flow to and from the at least one accumulator and, if included, the flow of energy to and from the flywheel such that: in a steady state mode, a first hydraulic pump/motor is energized by an engine to cause hydraulic fluid to flow and actuate a drive line attached to a second hydraulic pump/motor; in a deceleration mode, the second pump/motor is operates as a pump to transfer energy to the at least one flywheel and/or accumulator; and in an acceleration mode, energy is transferred from the at least one flywheel and/or accumulator to the second hydraulic pump/motor to actuate the driveline and accelerate the vehicle.

7 Claims, 5 Drawing Sheets

SYSTEM AND METHOD FOR PROVIDING A LAUNCH ASSIST SYSTEM

PRIORITY CLAIM

The present application claims priority to U.S. Provisional Application No. 60/715,790, filed Sep. 10, 2005, the contents of which are incorporated herein by reference.

BACKGROUND OF THE INVENTION

1. Field of the Invention

The present invention relates to a system and method of providing a hydraulic braking system and more specifically to providing a hydraulic braking system in a vehicle that utilizes a hydraulic transmission.

2. Introduction

A hydraulic transmission is a known component which can improve the wear and tear on heavy vehicles. SuperDrive, Inc., in Ohio, is an example of a company that sells a hydraulic transmission as a replacement transmission to the standard mechanical shaft used in most vehicles. FIG. 1 illustrates a basic hydraulic transmission 100. An engine such as a diesel engine 102 is mechanically connected to a hydraulic pump 106.

Hydraulic line 114 and return hydraulic line 116 connect the pump 106 to a hydraulic motor 108 that turns a drive line 112 when hydraulic fluid flows through it. A charge and lube pump 110 is preferably used to pick up hydraulic leakage and for lubrication of surfaces. This charge pump is typically charged to around 350 PSI. A computer control 104 is in communication with the motor 102, pump 106 and motor 108 via lines 118 to control the operation of the hydraulic transmission. This system is a high pressure closed-loop hydraulic cycle and provides for a continuously variable transmission.

The continuously variable transmission (CVT) can handle heavy torque loads and high speeds with improved fuel economy and reduced emissions. A CVT is an automatic transmission that does not shift from one gear to another as the vehicle accelerates, but provides constant, smooth acceleration. The system 100 is coupled to the crankshaft at the rear of the engine in the conventional location for transmissions. The unit installed in the transmission cavity incorporates an axial piston variable hydraulic pump and an axial piston variable hydraulic motor assembled as a single unit. In addition, the system may include a heat exchanger, a reservoir (not shown).

A similar powertrain is shown in U.S. Pat. No. 6,719,080 except that the '080 patent discloses multiple hydraulic lines 23, 24, 25, 26 in FIG. 1. The system 100 only utilizes a single hydraulic loop 114, 116 between the drive pump 106 mechanically connected to the engine 102 and the hydraulic motor 108 connected to the drive line 112.

The system 100 controls the hydraulic pump 106, motor 108 and the diesel engine 102 through the electronic control module 104. The control module 104 manages the engine such that it does not run at a constant RPM. The variability of the engine RPM provides more engine responsiveness and power, and is less wasteful of fuel. For example, the diesel motor 102 may be controlled not to ramp up its RPM as quickly at acceleration and to maintain a more constant RPM while accelerating and decelerating.

This control module 104 manages engine RPM and loading, and pump and motor swash plate position. Fuel economy is further enhanced by the ability of the system to reduce engine RPM while at road speeds. The system 100 increases the ability to provide higher torque at lower engine speeds in effect acting like an overdrive, but providing the ability to continuously maximize the torque output to the rear wheels at all vehicle speeds.

There are many advantages to the hydraulic transmission system 100. However, there are some capabilities for improvement that have not yet been realized. For example, with a hydraulic powertrain, what is needed in the art is a system for improving the efficiency of the transmission and particularly in how to manage braking.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention provides an additional advantage to a hydraulic transmission system such as the SuperDrive system by breaking into the hydraulic system and storing energy in an accumulator when braking. The energy is then used for propulsion as well as for obtaining more energy from heat.

The present invention provides for a system and method of using accumulators in a hydraulic transmission to provide a launch assist system in which hydraulic fluid is pressurized during a deceleration phase. During an acceleration phase, the stored pressurized fluid is release to begin acceleration of the vehicle.

Various embodiments of the invention relate to systems, methods and computer readable media for providing a hydraulic system for a vehicle. The system includes at least one accumulator for storing hydraulic fluid and may also include a flywheel or other storage mechanism for storing energy. Energy may be stored either in one of the accumulators or the flywheel. A control system controls fluid flow to and from the at least one accumulator and, if included, the flow of energy to and from the flywheel such that: in a steady state mode, a first hydraulic pump/motor is energized by an engine to cause hydraulic fluid to flow and actuate a drive line attached to a second hydraulic pump/motor; in a deceleration mode, the second pump/motor is operates as a pump to transfer energy to the at least one flywheel and/or accumulator; and in an acceleration mode, energy is transferred from the at least one flywheel and/or accumulator to the second hydraulic pump/motor to actuate the driveline and accelerate the vehicle.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 2:
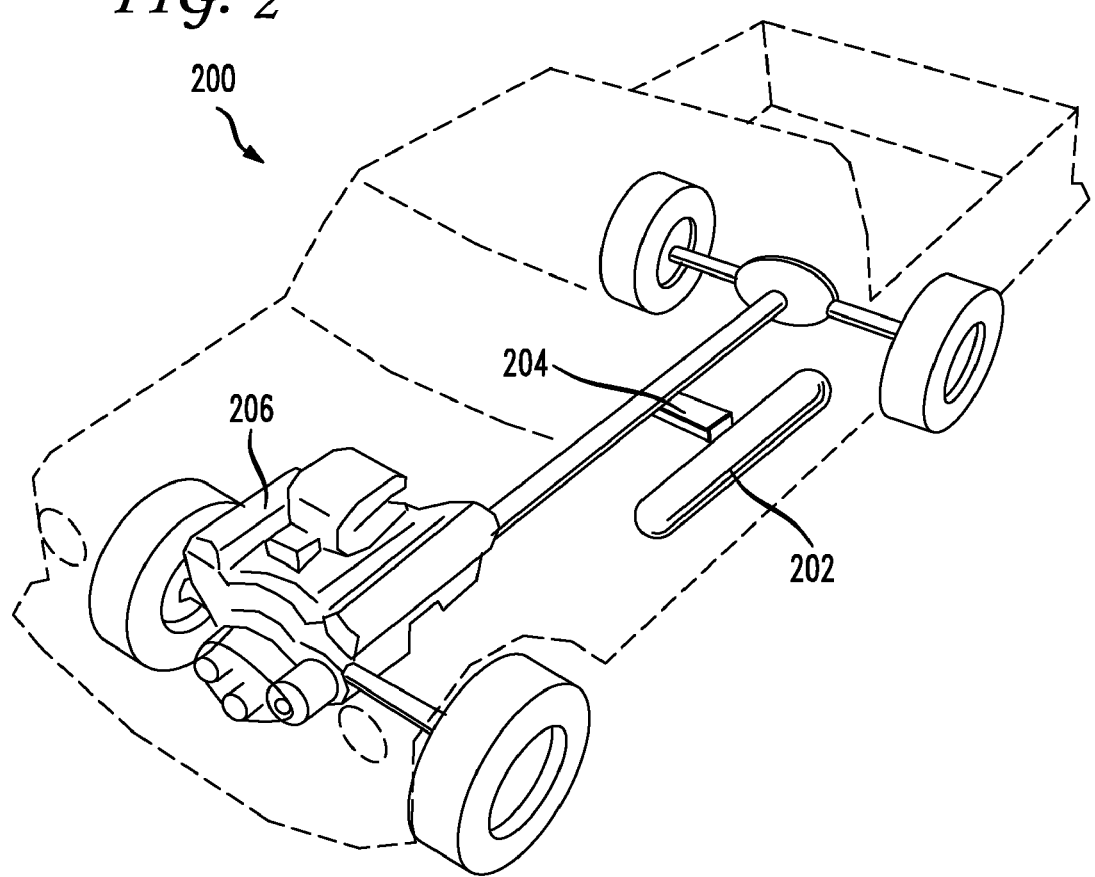
FIG. 2 illustrates a SHEP system in a truck.

A known system for storing hydraulic energy is the SHEP (stored hydraulic energy propulsion) system. A SHEP captures energy used during braking and recycles the energy back into the vehicle at the time it needs it most; when accelerating from a dead stop. FIG. 2 illustrates a SHEP system attached to a drive shaft of a vehicle 200. At a dead stop, this is the time at which the engine is performing least efficiently, burning the most fuel, and emitting the most pollutants.

During the braking process, formerly wasted energy is captured in hydraulic tanks 202 (accumulators) attached to the vehicle's chassis. When the vehicle accelerates from a dead stop, the computer instructs the pump 204 to apply the stored energy to the drive shaft. The vehicle moves forward without requiring the engine to do so. Once the energy stored in the hydraulic system has been used up, the computer instructs the normal engine function to take over. The next time the brakes are applied, the hydraulic tanks capture the wasted energy once again, and the process is repeated when accelerating. The SHEP may also store energy when the driver takes his or her foot off the pedal such that it causes the braking. The three components which work in tandem to achieve the SHEP result include (1) Hydraulic Storage: Two hydraulic tanks are installed under the vehicle which store the kinetic energy used in braking. This is known as the UAS (Unitised Accumulator System) 202; (2) Ifield Pump/Motor: There is a pump 204 which is used to transfer the energy stored in the hydraulic tanks directly to the drive shaft of the vehicle, thereby propelling the vehicle forward without using any fuel; and (3) Electronic Control System: The control system instructs all the components to interact properly. (not shown in FIG. 2).

Figure 1:
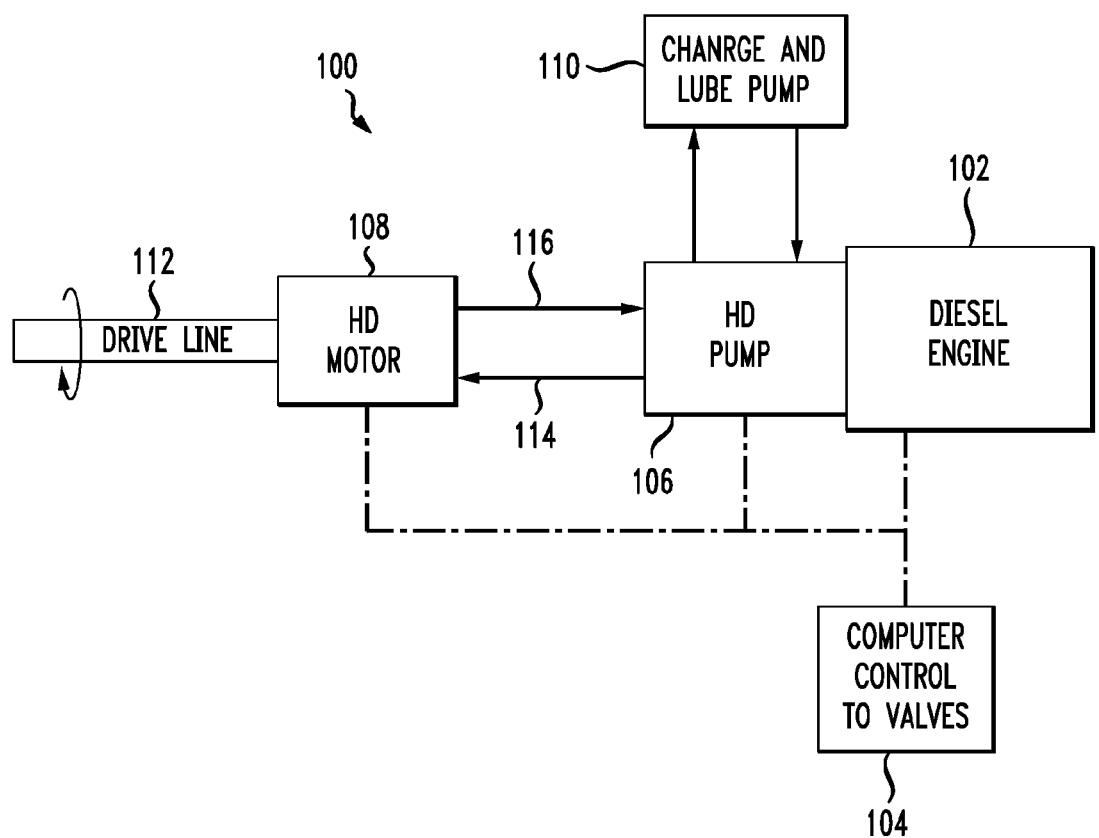
FIG. 1 illustrates a known example hydraulic transmission.

The present invention provides a blending and modification of a SHEP to work in the context of a hydraulic transmission such as that shown in FIG. 1 or that disclosed in the '080 patent. The present configuration will be described with respect to a hydraulic transmission but may be applicable and modified to work with other hydraulic transmission systems.

Before returning to the invention, we will further discuss the basic features of the system shown in FIG. 1. The main pump 106, mounted directly behind the engine 102 and driven by it, is preferably an axial type with five cylinders arrayed around a swash plate. The plate moves to alter the cylinders' displacement, and therefore the flow of hydraulic fluid. This in turn constantly changes the drive ratio. Pressurized fluid runs through hoses 114, 116 to and from the motor 108 that's mounted ahead of the rear axle's differential. A vehicle with a live tandem may have two motors, one ahead of each differential. As can be appreciated, the various components in such as system may be altered depending on the vehicle size and usage. For example, a garbage truck may have different needs from a Greyhound Bus or a school bus.

Operating pressure changes depending on the use, the terrain, and the vehicle speed. The control module (ECM 104 notes the situation and orders more power from the engine and adjustments of the swash plate inside the axial pump. The ECM's 104 programming includes 48 ratio-type "steps" for the swash plate, but they are so closely spaced that changes are not noticeable to a driver. As an example, a vehicle with the hydraulic system can run about 800 to 1,300 RPM. This takes advantage of a diesel's torque peak, which is usually 1,000 to 1,200 RPM. It yields fewer combustion events per mile, while allowing for more complete combustion which improves fuel economy.

The invention will be introduced in several modes, a steady state mode, an acceleration mode and a deceleration mode. The invention alters the hydraulic configuration and control module of a hydraulic transmission system to enable the incorporation of a SHEP-type storage system for use in braking and initial acceleration. This system could be characterized as a launch assist system (LAS).

Figure 3A:
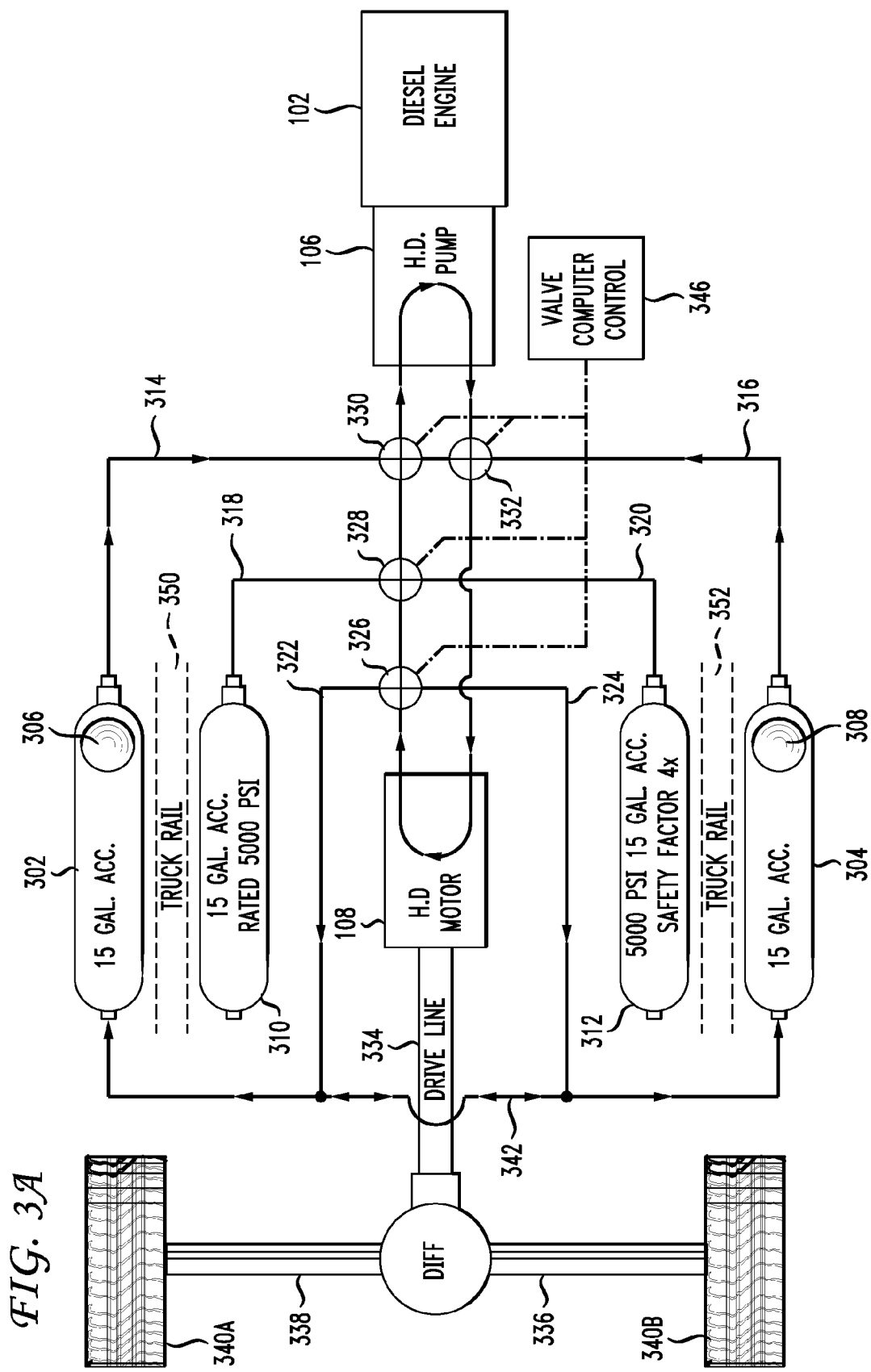
FIG. 3A illustrates the present invention in a steady state mode.

FIG. 3A illustrates a configuration of the present invention in a steady state mode (time 1). This system in the steady state mode essentially taps into the closed-loop hydraulic system shown in FIG. 1 and turns it into a lower pressure open loop system using lower pressure reservoirs and accumulators. An example of the steady state mode would be a vehicle operating at 65 MPH on flat ground or substantially flat ground. A diesel engine 102 is mechanically connected to a hydraulic pump 106. In a cruising mode for a vehicle, the pump 106 may operate, for example, at around 3,000 PSI. The vehicle would be running under power from its engine 102.

Hydraulic line 301 carries hydraulic fluid from the pump 106 to the hydraulic motor 108 which is mechanically communicating with a drive line 334. The drive line turns when hydraulic fluid flows and turns the differential 336, which turns the axil 328 and finally the wheels 340A, 340B of the vehicle as is known in the art. Hydraulic line 303 carries hydraulic fluid flowing from the motor 108 either back to the pump 106 or other locations depending on the valve system.

Valves 326, 328, 330 and 332 each are preferably three way valves that can handle high pressure control. In this regard, control of the valves will be from smaller hydraulic lines (not shown) and computer control from an electronic control module 346. Those of skill in the art will understand the basic features of such valves, which are preferably three-way valves. Companies such as Denison Hydraulics and Parker-Hannifer produce such valves.

Hydraulic tanks 302 and 304 are mounted on a vehicle railing 250, 252 and each contain a charge pump 306, 308. Smaller hydraulic lines (not shown) connect the charge pumps 306, 308 (or some other source of hydraulic fluid) to the valves 326, 328, 330 and 332. The charge pumps 306, 308 are also controlled by the computer controller 346 such that the appropriate hydraulic fluid can provide the power to turn the three-way valves 326, 328, 330 and 332 as appropriate for the conditions. Those of skill in the art will understand the basic needs to control and actuate the high pressure three way valves shown in the figures.

The tanks 302 and 304 are preferably lower pressure tanks with relatively thin walls. These tanks may even have the ability to vent pressure to the atmosphere. Hydraulic line 314 connects tank 302 to valve 330 and hydraulic line 316 connects valve 332 to tank 304. Hydraulic accumulator tanks 310 and 312 are higher pressure tanks (such as, for example, rated at 5,000 PSI) having collapsible bladders that are charged with nitrogen. There are two valves in these tanks and the bladder collapse as the accumulators are filled with high pressure fluid. The pressure on each side of the bladder membrane is equal. Companies such as Parker-Hannifin make such accumulator tanks with Greer bladders.

The accumulator 310 is connected via a line 318 to valve 328 and accumulator 312 is connected by a line 320 to valve 328. Valve 326 is connected to line 303 leaving the motor 108 as well as to valve 328 and lines 322 and 324 and provide a return path for hydraulic fluid to tanks 302 and 304 through line 342. Line 342 is also used to equalize the pressures in the tanks 302 and 304.

The operation of each time frame in FIGS. 3A, 3B and 3C will now be explained. In time 1 shown in FIG. 3A, the steady state or engine-powered mode will provide the example operation while a vehicle is traveling down a generally flat road. Hydraulic fluid will flow from the tanks 302, 304 through lines 314, 316 to valve 330 and 332. Valve 330 is configured to receive the fluid from line 314 and transmit it up to the pump 106. Valve 332 will pass fluid from line 316 to valve 330. Valve 330 is configured to receive fluid from valve 332 and allow it to flow up to the pump. Valve 330 may also be off in that no fluid is allowed to flow from line 316. In this manner, fluid may only flow from tank 302 (or alternately only from tank 304) into the pump 106. The charge pumps 306, 308 retrieve the fluid from the tank and pump or force it into the lines to the pump 106. The fluid flowing into the pump 106 actuate the motor pistons and pump squash plate and the diesel motor also turns the pistons and squash plate in the pump 106. The diesel motor picks up that fluid and accelerates it into a high pressure, for example 6,000 PSI. At a cruising speed the pressure would likely be more in the range of 3,000 PSI. The engine 102 turns the pistons and the squash plate in the pump 106 and accelerates the hydraulic fluid into a high pressure state for communicating it through line 301 to the motor 108 which in turn turns the driveline 334. Valve 332 is set to only allow fluid to flow from the pump 106 to the motor 108.

Figure 3B:
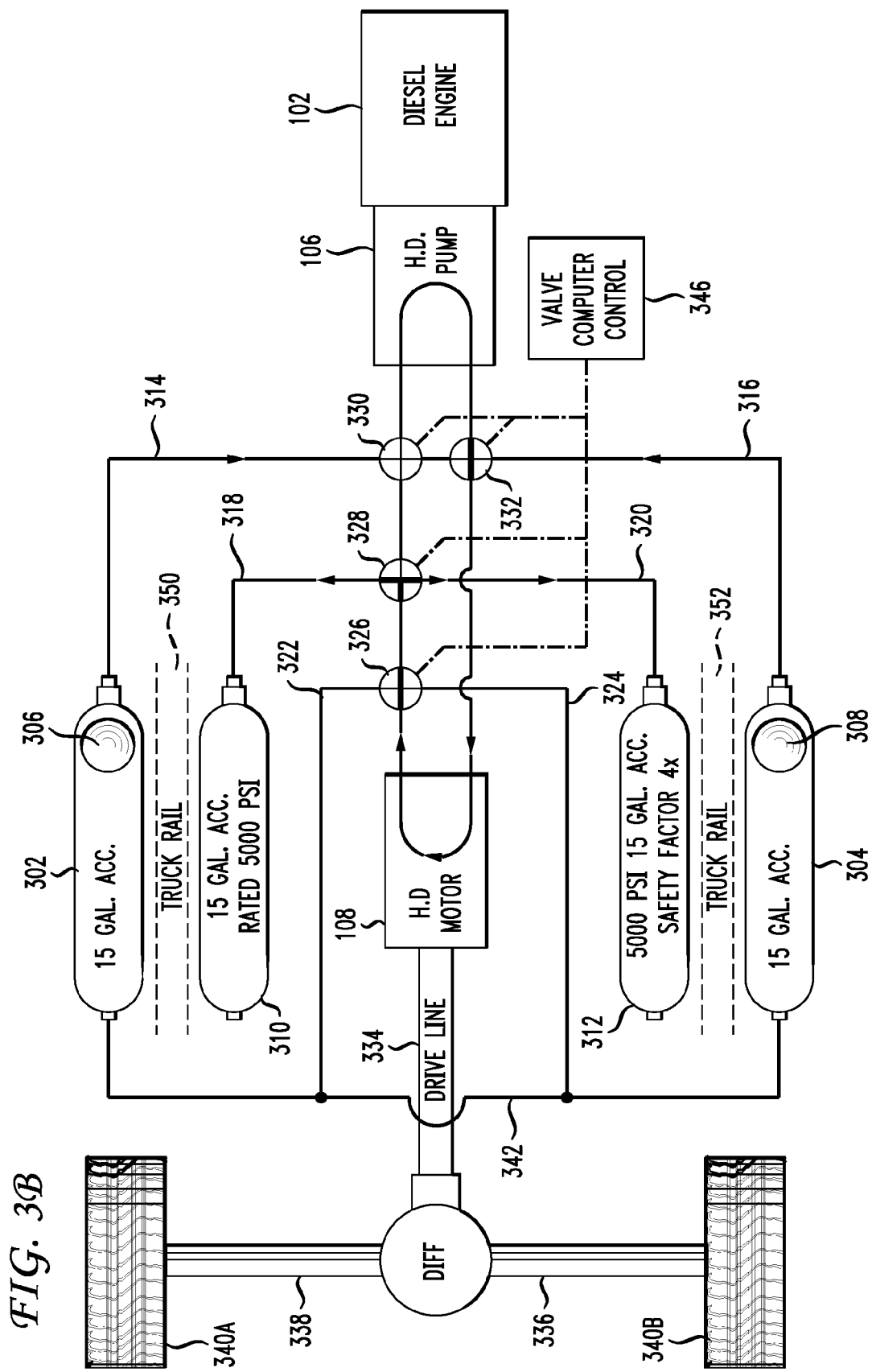
FIG. 3B illustrates the present invention in an acceleration mode.

FIG. 3B illustrates the operation for time 2 which relates to deceleration. This mode is for slowing the vehicle down and charging the accumulators 310, 312. In this mode, the motor 108 turns into a pump such that high pressure fluid is stored in the accumulators 310, 312. The motor/pump 108 will turn based on the wheels communicating with the differential 326 and drive line 334 which is connected to the motor/pump 108. Valve 326 is set to transmit fluid straight through on line 303 to valve 328. This valve is set in as a "T" where fluid is forced to travel through lines 318 and 320 to at least one of accumulators 310, 312. These are high pressure accumulators that can store, for example, fluid at 5,000 PSI. Fluid may be received via valves 330 and 332 from one or more of the tanks 302, 304. This mode can assist in the deceleration of the vehicle and can prevent wear and tear on the standard braking system.

Figure 3C:
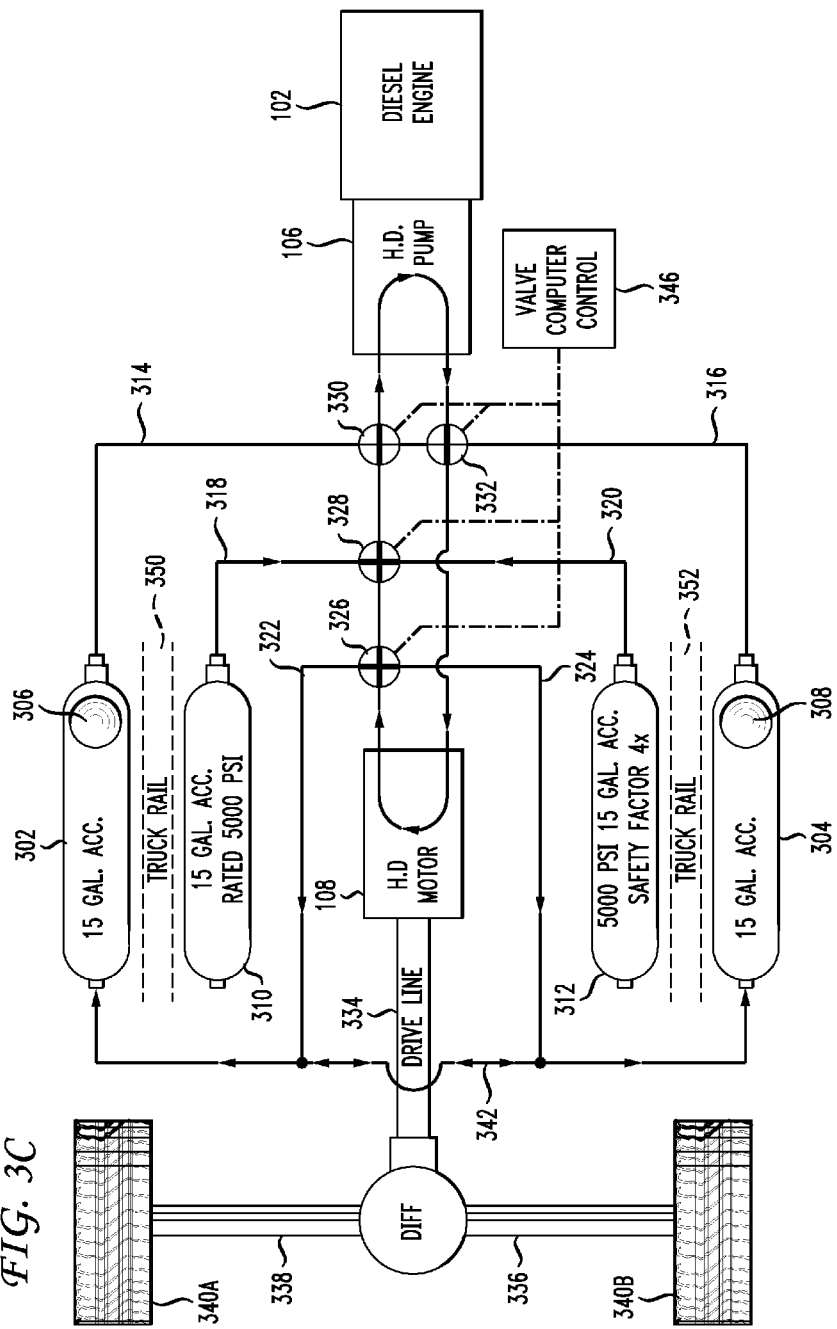
FIG. 3C illustrates the present invention in a deceleration mode.

FIG. 3C illustrates the re-acceleration mode where fluid is released from the accumulators 302, 304 to initiate acceleration of the vehicle. An example of this mode is where the vehicle has stopped, pressurized fluid is stored in the accumulators ready for use to initiate or assist in acceleration of the vehicle. In this mode, valve 328 is set to receive fluid from the high pressurized accumulators 310, 312 and transmit it through valve 330 to the pump 106 and then out from the pump through valve 332 and line 301 to the motor 108. This pressurized fluid will cause the motor to turn the drive shaft and begin to move the vehicle. This initial supercharge of the system with high pressure fluid will occur for about three seconds. Other times shorting and longer may also be utilized. The control 346 will then manage a merging of the acceleration from the fluid from the accumulators to the diesel motor 102. This process reduces the need of the motor 102 to rev up its RPM's to initiate movement of the vehicle. In this mode, the hydraulic fluid leaving the motor 108 is routed at valve 326 left and right through lines 322 and 324 back to reservoirs 302, 304.

With any hydraulic storage and release system as described above, heat is generated both in hydraulic storage and while releasing the energy for use in acceleration. In this regard, approximately 30% of the possible energy is wasted as heat in the storage and release process at least in accumulators 310, 312. This extra heat may be lost to the environment. An aspect of the present invention is to incorporate the principles of the invention and gather heat for use in a secondary closed-loop thermodynamics cycle as is disclosed in U.S. patent application Ser. No. 11/154,466, filed on Jun. 16, 2005, incorporated herein by reference. The secondary thermodynamics cycle would alter its heat gathering portion to in the cascading manner, retrieve heat from the storage and release process of hydraulic fluid into and from the accumulators. Not shown in FIG. 3A in this regard would be a transfer coil that is connected to the heat gathering loop in the related patent application. It is desirable to keep hydraulic fluid in the 150-180 degree temperature range and a heating coil in accumulators 310, 312 and/or in tanks 302, 304 enables the secondary thermodynamics cycle to draw this excess heat from the system in FIG. 3A and utilize it for generating electricity for running other components in the vehicle. The location of the heat exchange from the accumulator and/or tanks in this system would preferably be place in the appropriate descending order of the heat transfer order in the '466 application. This would further increase the efficiency of the secondary thermodynamics cycle. In this regard, the present invention with its hydraulic transmission system can be blended with the '466 application.

Another embodiment of the invention is to replace the accumulators 310, 312 with at least one flywheel wherein during deceleration the generated fluid pressure by pump 108 can be directed to a flywheel for the purpose of turbocharging the engine, storing mechanical energy or electrical energy. This embodiment has the benefit of also slowing down the vehicle not using the normal braking system but also generating extra energy during the deceleration process of the vehicle.

Using flywheels in place of the accumulators provides a small amount of weight savings. It provides some additional features for long haul trucks where as the flywheel is used during braking or to cause braking, the flywheel spins to a very high speed. You can then draw the energy from the flywheel at startup or to accelerate the vehicle. As an example, using a flywheel, if a truck is on the highway and the driver takes his or her foot off the accelerator, the flywheel can be used to slow the vehicle down from 55 MPH to 50 MPH. The speed may be considered as a high speed at any threshold, such as 40 MPH. The system can slow the vehicle down and assist with acceleration from any range of speeds. The energy in the spinning flywheel can then be used to speed the truck back up at least a portion of that speed, say to 53 MPH. The remaining acceleration needed to return to the original speed may need to be provided by the engine. The advantage of the flywheel is that it is easer than the accumulators to handle all ranges of speed from zero to a higher speed.

Embodiments within the scope of the present invention may also include computer-readable media for carrying or having computer-executable instructions or data structures stored thereon. The computer-readable medium may store instructions for controlling a computing device that communicates with the various valves, motors, engine, tanks, accumulators, flywheels, and other components to manage the hydraulic system and LAS. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, as mentioned above, the principles of the invention may be utilized in a computer-readable medium that stores instructions for controlling a computing device to manage and control a hydraulic transmission system such that the deceleration process stores energy in either accumulators or via a flywheel for use in acceleration or in other devices on the vehicle. Accordingly, the appended claims and their legal equivalents should only define the invention, rather than any specific examples given.

I claim:

1. A hydraulic system for a vehicle comprising:
   at least one accumulator for storing hydraulic fluid;
   a control system for controlling fluid flow to and from the at least one accumulator such that:
   in a steady state mode, a first hydraulic pump/motor is energized by an engine to cause hydraulic fluid to flow and actuate a drive line attached to a second hydraulic pump/motor;
   in a deceleration mode, the second hydraulic pump/motor is operated as a hydraulic pump and hydraulic energy from slowing the vehicle down is stored in the at least one accumulator; and
   in an acceleration mode, hydraulic fluid is released from the at least one accumulator to cause the second hydraulic pump/motor to actuate the drive line to accelerate the vehicle, wherein excess heat is gathered in a secondary closed-loop thermodynamic cycle that is utilized to generate electricity.

2. The system of claim 1, wherein four valves are controlled by the control system to move fluid to and from four accumulators.

3. The system of claim 1, further comprising at least one flywheel that stores deceleration energy.

4. The system of claim 3, wherein the stored energy in the flywheel is used to accelerate the vehicle through the second hydraulic pump/motor.

5. A hydraulic system for a vehicle comprising:
   at least one accumulator for storing hydraulic fluid;
   at least one flywheel for storing energy;
   a control system that controls fluid flow to and from the at least one accumulator and the flow of energy to and from the flywheel such that:
   in a steady state mode, a first hydraulic pump/motor is energized by an engine to cause hydraulic fluid to flow and actuate a drive line attached to a second hydraulic pump/motor;
   in a deceleration mode, the second pump/motor is operates as a pump to transfer energy to the at least one flywheel; and
   in an acceleration mode, energy is transferred from the at least one flywheel to the second hydraulic pump/motor to actuate the driveline and accelerate the vehicle, wherein excess heat is gathered in a secondary closed-loop thermodynamic cycle that is utilized to generate electricity.

6. The system of claim 5, wherein the deceleration and acceleration modes can operate at higher speeds.

7. The system of claim 6, wherein the higher speeds are over 40 mph.

* * * * *